(12) United States Patent
Park et al.

(10) Patent No.: US 9,905,126 B2
(45) Date of Patent: Feb. 27, 2018

(54) HOME ENVIRONMENT MANAGEMENT METHOD AND APPARATUS

(71) Applicant: Intel Corporation, Santa Clara, CA (US)

(72) Inventors: Mi Sun Park, Hillsboro, OR (US); Lei Yang, Hillsboro, OR (US); Jung Woo, Portland, OR (US); Shahrokh Shahidzadeh, Portlant, OR (US); Myung Hwangbo, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/182,437

(22) Filed: Jun. 14, 2016

(65) Prior Publication Data

US 2017/0358202 A1    Dec. 14, 2017

(51) Int. Cl.
| | | |
|---|---|---|
| G08B 13/10 | (2006.01) | |
| G08C 17/02 | (2006.01) | |
| G06K 7/10 | (2006.01) | |

(52) U.S. Cl.
CPC ......... *G08C 17/02* (2013.01); *G06K 7/10366* (2013.01)

(58) Field of Classification Search
CPC ............................ G08C 17/02; G06K 7/10366
See application file for complete search history.

(56) References Cited

U.S. PATENT DOCUMENTS

| | | | |
|---|---|---|---|
| 8,456,304 B2* | 6/2013 | van Doorn ............ | G01S 13/003 340/541 |
| 2005/0055568 A1* | 3/2005 | Agrawala ........... | G07C 9/00111 726/2 |
| 2006/0017566 A1* | 1/2006 | Gauvreau .......... | G08B 13/2491 340/541 |
| 2007/0069021 A1* | 3/2007 | Elrod .................... | G06K 17/00 235/451 |

(Continued)

FOREIGN PATENT DOCUMENTS

WO    2015-099721 A1    7/2015

OTHER PUBLICATIONS

International Search Report and Written Opinion dated Jul. 26, 2017, issued in related International Application No. PCT/US2017/032652, 12 pages.

*Primary Examiner* — Nabil Syed
(74) *Attorney, Agent, or Firm* — Schwabe, Williamson & Wyatt, P.C.

(57) ABSTRACT

Embodiments of the present disclosure provide techniques and configurations for a system to manage a home environment. In one instance, an apparatus for managing a home environment may be configured to detect variations in parameters of signals provided by RFID tags disposed in the home environment to monitor the home environment. The apparatus may identify one or more conditions of an area of the home environment in which the RFID tags are disposed, based at least in part on the variations in the one or more parameters and respective locations of the RFID tags in the area of the home environment. The apparatus may select one or more actions, from a plurality of actions associated with the home environment, based at least in part on the identified conditions. The selected actions may be performed to respond to the identified conditions. Other embodiments may be described and/or claimed.

24 Claims, 10 Drawing Sheets

(56) References Cited

U.S. PATENT DOCUMENTS

| | | |
|---|---|---|
| 2007/0200658 A1 | 8/2007 | Yang |
| 2008/0277486 A1 | 11/2008 | Seem et al. |
| 2009/0195360 A1* | 8/2009 | Jeon .................... H04B 5/0062 340/10.1 |
| 2010/0121613 A1 | 5/2010 | Rosca et al. |
| 2013/0024029 A1* | 1/2013 | Tran ...................... A61B 5/1113 700/278 |
| 2014/0046462 A1 | 2/2014 | Mets |
| 2016/0217664 A1* | 7/2016 | Bradford ................ E04F 15/02 |

* cited by examiner

| Tag Type 1002 | Fields 1004 | | | | | | | | Action 1006 |
|---|---|---|---|---|---|---|---|---|---|
| | Standing Water | Wet | Hot>110 | Standing<6 tiles | Laying<2min >7 tiles | Laying>2min >7 tiles | Traffic Detection | If security is armed then this bit is set Lockup | a) b) c) d) indicate conditions present for action to be taken |
| | | | | | | | | | Rule engine |
| Shower Flooring | x | x | x | x | x | x | x | | Text owners/family and alarm 911 if a)>7 tiles and >2min, b)Hot>110F +Laying>2min --> shut down water c) if Lockup but traffic detection d)wet but no traffic then know pipe broken |
| Laundry Room Flooring | x | x | x | x | x | x | x | x | Text owners/family and alarm 911 if a)>7 tiles and >2min, b)Hot>110F c)Standing water and shut down water main, d)Lockup and traffic detected e) laying (assume nobody sleeps in laundry room unless you have a dog...) |
| Bathroom Flooring | x | x | x | | x | | x | x | Text owners/family and alarm 911 of condition if a)>7 tiles and >2min, b)Hot>110F c)Standing water triggers shut down water main function, d)Lockup and traffic detected e) laying (assume nobody sleeps in bathroom unless you have a dog...) |
| Bedroom Flooring | x | | x | | | | x | x | Text owners/family and alarm 911 of condition if a)Hot>110F b)Lockup and traffic detected |
| Playroom Flooring | x | | x | | | | x | x | Text owners/family and alarm 911 of condition if a)Hot>110F b)Lockup and traffic detected |
| Basement | x | x | x | | | | x | x | Text owners/family and alarm 911 of condition if a)Hot>110F b)Lockup and traffic detected c) Wet d)Standing water |
| Hallway | x | | x | | | x | x | x | Text owners/family and alarm 911 of condition if a)>7 tiles and >2min, b)Hot>110F c)Standing water triggers shut down water main function, d)Lockup and traffic detected e) laying (assume nobody sleeps in hallway unless you have a pet...) . hallway is tile and gets mopped |
| Kitchen | x | x | x | | | x | x | x | Text owners/family and alarm 911 of condition if a)>7 tiles and >2min, b)Hot>110F c)Standing water triggers shut down water main function, d)Lockup and traffic detected e) laying (assume nobody sleeps in kitchen unless you have a dog...) . Wet rule is OK as kitchen is tile and gets mopped |

Fig. 10

HOME ENVIRONMENT MANAGEMENT METHOD AND APPARATUS

FIELD

Embodiments of the present disclosure generally relate to the field of ambient environment automation, and in particular to management of a home environment based on determination of conditions of the home environment.

BACKGROUND

Environment (e.g., home environment) management technologies have been a part of fledgling Internet of Things (IoT) platforms. There have been many attempts to realize home automation from simple control of lights and appliances to prevention of or alert about unexpected break-ins. These efforts may require the employment of a variety of devices in an environment, such as motion sensitive lights, video cameras, security systems, remote control systems for heating and cooling, pressure, smoke, and water leak detectors, and so on. In some instances, conflict between functionalities of different devices may increase the probability of malfunction. Furthermore, many of these systems may require user input, such as user remote control via a smartphone. Also, the existing home automation solutions may be costly and difficult to integrate.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 10 provides an example list of areas of a home environment, associated conditions to be analyzed, and actions to be taken in response to identified conditions, in accordance with some embodiments.

DETAILED DESCRIPTION

Figure 1:
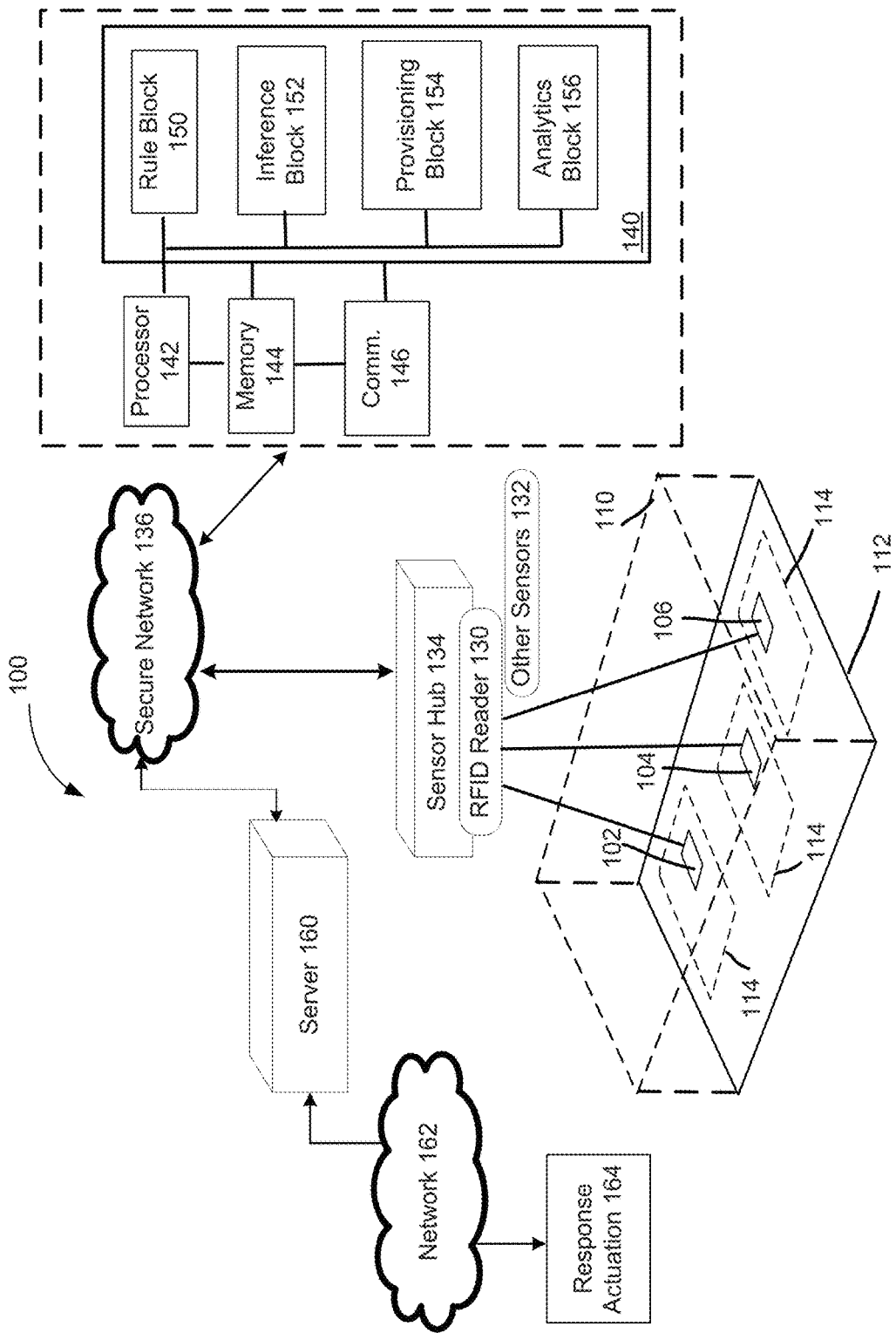
FIG. 1 is a diagram illustrating an example system for environment (e.g., home environment) management incorporated with the teachings of the present disclosure, in accordance with some embodiments.

Embodiments of the present disclosure include techniques and configurations for an apparatus and method for environment (e.g., home environment) management. In some embodiments, an apparatus for managing a home environment may be configured to detect variations in parameters of signals provided by signal transmission devices such as radio-frequency identification (RFID) tags disposed in the home environment to monitor the home environment. The apparatus may identify one or more conditions of an area of the home environment in which the RFID tags are disposed, based at least in part on the variations in the one or more parameters and respective locations of the RFID tags in the area of the home environment. The apparatus may select one or more actions, from a plurality of actions associated with the home environment, based at least in part on the identified conditions. The selected actions may be performed to manage the home environment, such as to respond to the identified conditions.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 is a diagram illustrating an example system for environment (e.g., home environment) management incorporated with the teachings of the present disclosure, in accordance with some embodiments. The system for environment management may be configured to identify conditions of an area of the home environment in which signal transmission devices (e.g., RFID tags) of the system may be disposed. The area may comprise a portion of the home environment, such as a bedroom, a bathroom, a hallway, or any other area of a dwelling. The conditions may be identified (e.g., inferred) based on the variations in the RFID tag signal readings and respective locations of the RFID tags in an area of the home environment. The conditions may indicate abnormalities occurring in, or associated with, the area of the home environment. For example, the conditions may indicate intrusion, internal temperature higher than normal, leaks on the floor of the area, and the like. The system may select one or more actions to be performed to respond to the identified conditions (e.g., abnormalities). The actions may be selected from a plurality of actions associated with the home environment (e.g., with the area for which the conditions were identified). The actions may be tailored to the identified conditions and may be performed to manage the home environment, such as to respond to the identified conditions. For example, if the internal temperature is determined to be higher than normal, the action may include a command to a local device (e.g., thermostat) to lower the temperature to an acceptable level. In another example, if the floor of the area (e.g., a bathroom or laundry room) is determined to be wet, the action may include an alert to home owners or emergency call (e.g., 911) and/or attempt to shut off the water supply of the home.

In summary, the system described herein may be configured to detect and identify abnormalities of conditions related to an area of the home environment (e.g., temperature increase, break-in, water leaks, and the like), and provide a corresponding response to the abnormalities, such as auto-adjusting room temperature, sending an alert about water leaks or break-ins, and the like.

It should be noted that the system described herein may be applied outside of a home environment; for example, the system may be used in commercial or industrial environment.

The system 100 may include a plurality of signal transmission devices (e.g., RFID tags) 102, 104, 106 disposed in an environment, such as home environment, including an area 110 of the environment (shown in dashed lines). In embodiment, an area of the environment may comprise a part of the building, such as a dwelling. For example, the area 110 may be a bathroom, a bedroom, a hallway, a pantry, a laundry room, a living room, or a kitchen of a home. The RFID tags 102, 104, 106 may be disposed in different parts of the area 110. For example, as shown in FIG. 1, the RFID tags 102, 104, 106 may be disposed in a surface 112 of the area of the home environment, such as a floor. In different embodiments, the RFID tags 102, 104, 106, may be disposed in various other surfaces, including a floor, a wall, or a ceiling of the area 110. The RFID tags 102, 104, 106 may be associated with portions of the surfaces, such as tiles 114, 116, and 118 of the surface 112 (floor) respectively. In embodiments, the RFID tags 102, 104, 106 may be disposed around the surface 112 of the area 110 in a pattern.

At least some of RFID tags may be passive ultra-high frequency (UHF) tags comprising a microchip attached to an antenna. Passive RFID tags may not require a power source: they may use the transmitted signal from a RFID reader to power on and reflect energy back to the reader. The read/write memory in an RFID tag may store information such as tag identification data, location data, and the like, which may be transmitted by the RFID tag on a continuous or periodic basis.

In embodiments, the RFID tags 102, 104, 106 may be associated (e.g., embedded) with various types of sensors, for example, temperature sensors, and may be configured to transmit the relevant data (e.g., voltage values corresponding to measured ambient temperature).

Figure 2:
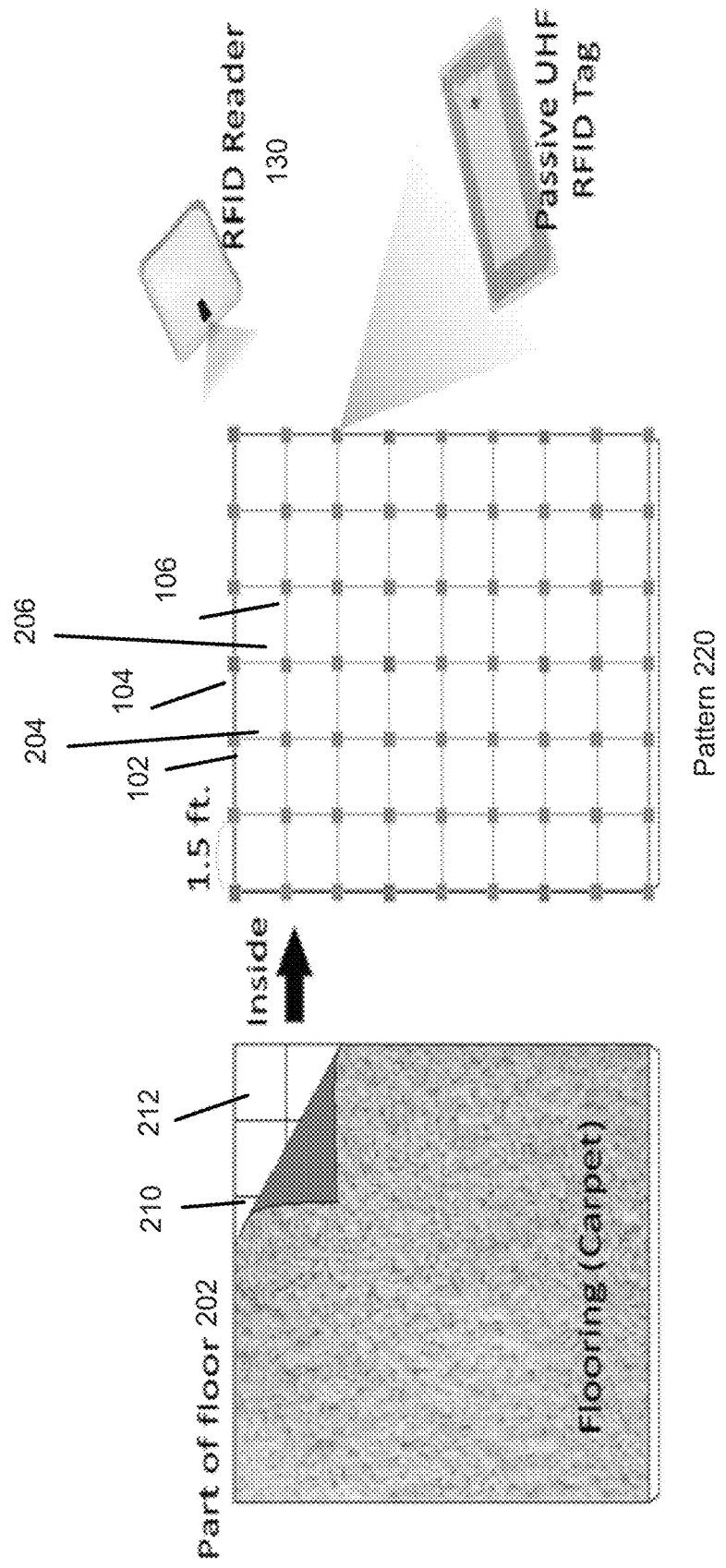
FIG. 2 is a diagram illustrating an example disposition of radio frequency identification (RFID) tags around a surface of a home environment area in a pattern, in accordance with some embodiments.

FIG. 2 is a diagram illustrating an example disposition of RFID tags around a surface of a home environment area in a pattern, in accordance with some embodiments. As shown, the RFID tags 102, 104, 106 may be disposed around the floor 202 in a pattern 220, e.g., in a two-dimensional grid pattern, such as at respective tops of quadrangles 204, 206, etc. The quadrangles 204, 206 may correspond to floor portions (tiles) 210, 212, etc. The RFID tag reader 130 may be installed in a ceiling or other portions of the area. The RFID tag reader 130 may continuously or periodically read the signals provided by the RFID tags of the area and send the signal data to backend processing as described below in detail. In embodiments, the RFID tag reader 130 may be located in each area of the home environment, to enable seamless reception of signals from RFID tags located in the area.

Some of the RFID tags may comprise reference tags provided for calibration of the signals provided by RFID tags to the RFID tag reader 130. For example, the signals from reference tags may be measured during the time when no activity is occurring in the area of the home environment, such as during night hours. Based on the measurements of signal provided by the reference RFID tags, the signal transmission parameters such as transmission (TX) power and reception (RX) sensitivity may be dynamically adjusted.

The RFID tag transmissions may have a determined read range (e.g., up to 12 meters). Accordingly, each area of the home environment (e.g., a room in a house) may include an RFID reader (e.g., installed on the ceiling) to continuously or periodically monitor all the RFID tags of the floor in the room. The signal information of RFID tags may be provided for analysis as described below in detail. Based on the analysis, conditions of the area (e.g., intruders, water leaks, appliance overheating etc.) may be identified and corresponding actions may be selected and undertaken, such as issuance of alerts and/or control of corresponding home devices or appliances.

Referring again to FIG. 1, the signals generated by the RFID tags 102, 104, 106 may be continuously received by the RFID reader 130 and provided to a sensor hub 134 for monitoring and processing. In embodiments, the RFID reader 130 may be an integrated RFID/sensor reader. In some embodiments, separate RFID and sensor readers may be practiced instead. The monitoring of parameters of RFID radio signals and detection of their variations may be based on the following considerations. RFID tags placed in a stationary position, e.g., in or on a surface such as a floor may generate regular signal patterns over time. A blockage of an RFID tag, e.g., by a human body, may absorb or attenuate the RF signals, reducing the tag read rate. For example, human movement on the surface 112 may cause a fluctuation of the signal provided by the RFID tags 102, 104, 106. Similarly, water leaks on the surface 112 may cause signal attenuation, weakening received signal strength indicator (RSSI) of the signals. Further, stationary RFID tags may have a Doppler frequency of a certain level (e.g., low level, around 0 Hz), while the RFID tags in motion may have a higher Doppler frequency.

Furthermore, the duration of the signal pattern variations may be taken into account. For example, if a person moves around an area stepping over or moving in proximity to the RFID tags embedded in the floor (e.g., floor tiles), the signals from RFID tags may temporarily change for particular periods of time (e.g., commensurate with the duration of the step of the person). In another example, occlusion of multiple tiles placed in proximity to each other and having embedded RFID tags may occur for a period of time above a threshold. For example, occlusion may be detected to affect seven tiles for over two minutes. The corresponding RFID tag signal variation may be detected for this time period, and it may be inferred that an object (e.g. a person) may be lying on the floor.

More generally, the location and characteristics of the RFID tags, such as relative location of the RFID tags in the area may be used for interpretation of RFID tag signals, detection of signal variations, and identification of corresponding conditions in the area. For example, relative location of the RFID tags, combined with RFID signal data, may be used to provide a heatmap of traffic in an area of home environment. As a human or a robot walks around a room the RFID tags integrated in the tiles that have been stepped on, may provide different levels of RSSI. Based on this information, a trajectory (heatmap) of an object motion around the area may be developed. For example, each RFID tag in a surface of an area (e.g., a floor) may be programmed with its location coordinates (e.g., two-dimensional coordinates). In another example, the RFID tags embedded in the walls of an area may have three-dimensional (3D) location coordinates. The RFID tags embedded in objects of the area may also have three-dimensional (3D) location coordinates. Accordingly, a 3D model of the area and objects (in motion or stationary) may be constructed without having to use a 3D reconstruction device, e.g., a camera.

Figure 3:
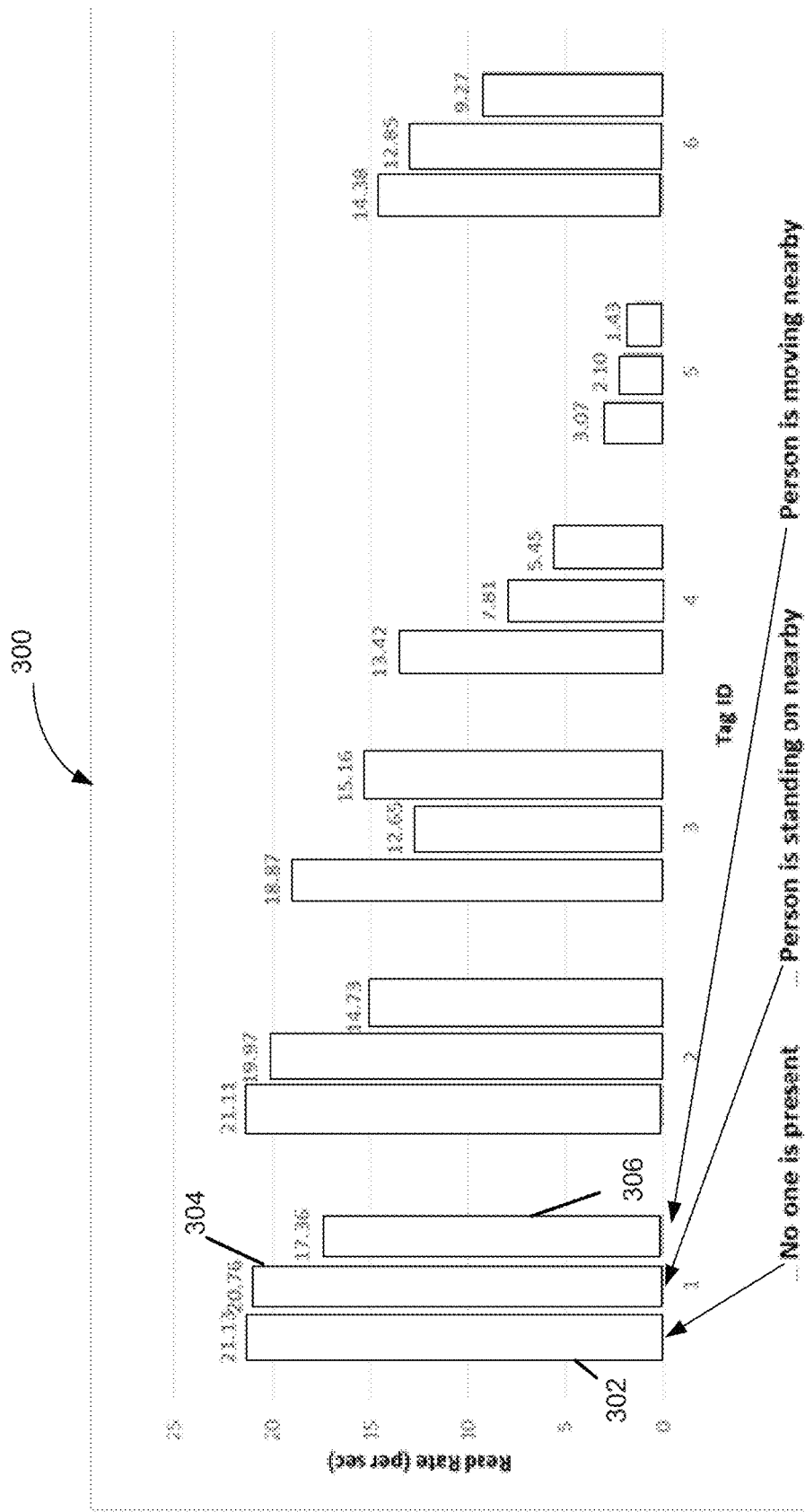
FIG. 3 is a graph illustrating example read rates of signals provided by the RFID tags disposed in a surface, such as a floor, as described in reference to FIG. 2, in accordance with some embodiments.
Figure 4:
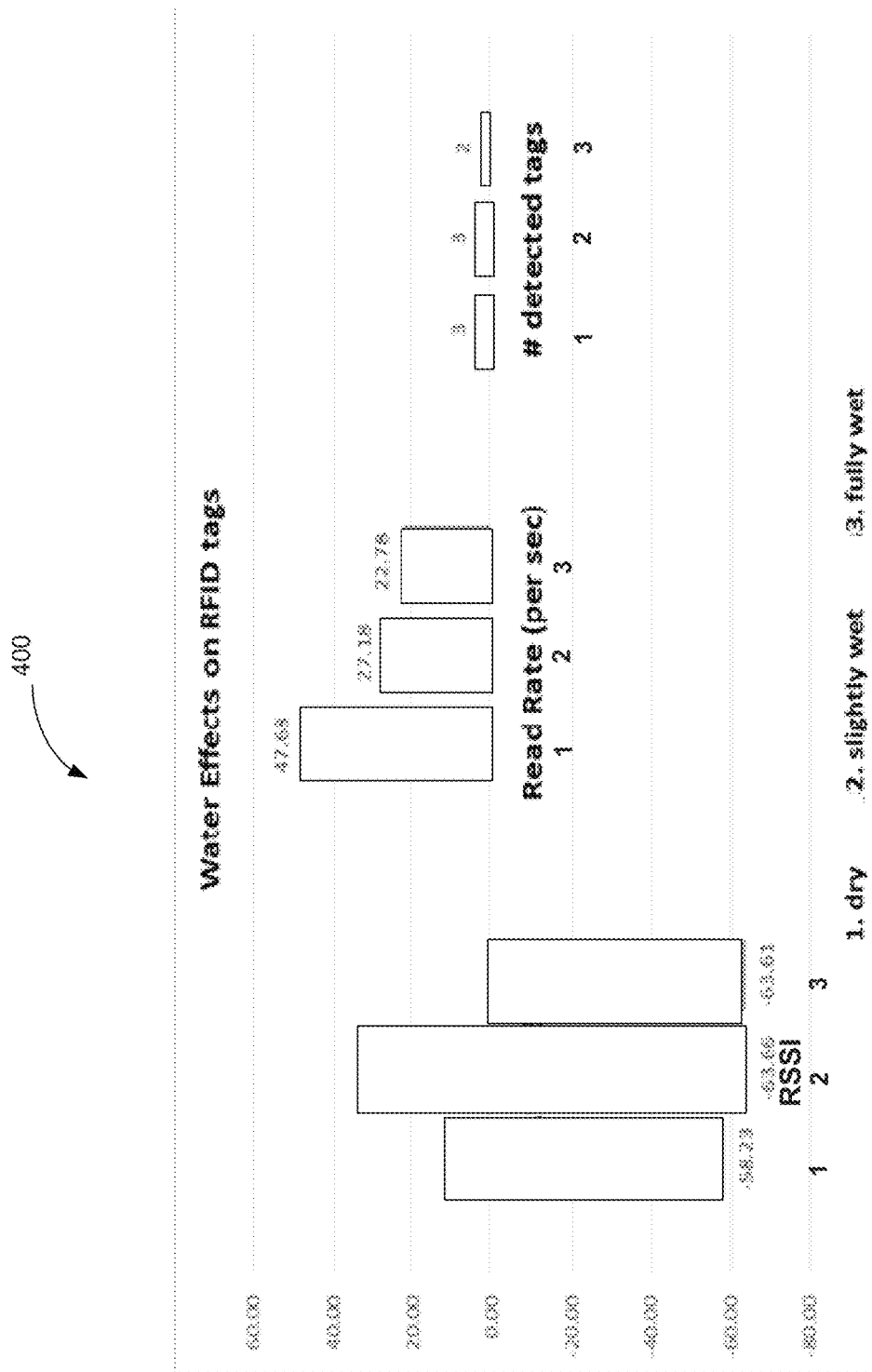
FIG. 4 is a graph illustrating example signals provided by the RFID tags disposed in a surface, as described in reference to FIG. 2, in accordance with some embodiments.

The effects of motion on the RFID tags, and obstruction or occlusion of the RFID tags embedded in a surface (e.g., surface 112) on signals provided by the RFID tags are described in reference to FIGS. 3-4.

FIG. 3 is a graph illustrating example read rates of signals provided by the RFID tags disposed in a surface, such as a floor, as described in reference to FIG. 2, in accordance with some embodiments. More specifically, the graph 300 illustrates a read rate of the signals provided by RFID tags in the following situations: no human presence on the surface, an object (e.g., a person) is present on the surface (e.g., in proximity to the RFID tag embedded in the surface), and an object (e.g., a person) is moving on the surface, such as stepping near or on the RFID tag embedded in the surface. While six example experimental results corresponding to six different RFID tags are shown, it is understood that numerous experiments may indicate similar effects of an object's motion on the surface with embedded RFID tags on the signals provided by these RFID tags.

As shown, a person in motion around the surface may provide disturbance on the signals generated by the RFID tags, which may be located underneath a foot of the person or in proximity to the moving person. As shown, the read rate of the RFID tags may decrease from an original value indicated by 302 (an instance when no one is present), to a lower value indicated by 304 (an instance when a person is standing proximate to the RFID tag) to a still lower value indicated by 306 (an instance when a person is moving in proximity to the RFID tag). Accordingly, changes in RFID signal patterns in response to an object motion on a surface may be used to infer people movement in the area and then provide appropriate response to such movement (e.g., alert the owners of the house or the police in case home intrusion has been inferred).

FIG. 4 is a graph illustrating example signals provided by the RFID tags disposed in a surface, as described in reference to FIG. 2, in accordance with some embodiments. More specifically, the graph 400 illustrates a read rate of the signals provided by RFID tags in the following situations indicated by numerals 1, 2, and 3: the surface (e.g., floor) is dry, slightly wet and fully wet (e.g., standing water). As shown, a presence of water may reduce the average RSSI, read rate, and/or tag detection. Based on the above changes in the signal pattern, an abnormal situation (e.g., flooding or standing water) may be inferred, and corresponding response may be provided.

Referring again to FIG. 1, the sensor hub 134 may receive the signals from RFID reader 130 (and/or, in some embodiments, from another receiver 132 coupled with different types of sensors), process the signals and provide the corresponding data (e.g., over a secure network 136) to an environment management block 140.

The environment management block 140 may be operated by a processor 142 to manage home environment, such as the area 110 and other areas of the home environment. More specifically, the environment management block 140 may identify one or more conditions of the area 110, based at least in part on the variations in the parameters and respective locations of the RFID tags 102, 104, 106 in the area 110. The environment management block 140 may select one or more actions, from a plurality of actions associated with the home environment, based at least in part on the identified conditions. The environment management block 140 may perform, or cause to be performed, in real time or near-real time, the selected actions in response to the identified conditions.

The processor 142 may include, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors including those in the Pentium®, Xeon®, Itanium®, Celeron®, Atom®, Quark®, Core® product families, or the like.

Examples of support circuitry may include host side or input/output (I/O) side chipsets (also known as northbridge and southbridge chipsets/components) to provide an interface through which the processor 142 may interact with other system components that may be operating at different speeds, on different buses, etc. Some or all of the functionality commonly associated with the support circuitry may also be included in the same physical package as the processor.

The environment management block 140 may be coupled with and may be able to access memory 144. The memory 144 may comprise random access memory (RAM) or read-only memory (ROM) in a fixed or removable format. RAM may include volatile memory configured to hold information during the operation of device 106 such as, for example, static RAM (SRAM) or Dynamic RAM (DRAM). ROM may include non-volatile (NV) memory circuitry configured based on basic input/output system (BIOS), Unified Extensible Firmware Interface (UEFI), etc. to provide instructions when device 106 is activated, programmable memories such as electronic programmable ROMs (erasable programmable read-only memory), Flash, etc. Other fixed/removable memory may include, but are not limited to, electronic memories such as solid state flash memory, removable memory cards or sticks, etc.

The environment management block 140 may be coupled with a communication block 146. The communication block 146 may be communicatively coupled with external devices, such as sensor hub 134 or an early warning server 160 and may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the communication block 146 may operate in accordance with one or more applicable standards in any version. To this end, the communication block 146 may include, for instance, hardware, circuits, software, or any combination thereof that allows communication with external computer systems.

In some specific non-limiting examples, the communication block 146 may comport with the Institute of Electrical and Electronics Engineers (IEEE) 802.11 standard (e.g., Wi-Fi), a Bluetooth®, ZigBee®, near-field communication, or any other suitable wireless communication standard. In addition, the communication block 110 may comport with cellular standards such as 3G (e.g., Evolution-Data Optimized (EV-DO), Wideband Code Division Multiple Access (W-CDMA)) and/or 4G wireless standards (e.g., High Speed Packet Access (HSPA), Worldwide Interoperability for Microwave Access (WIMAX), Long-Term Evolution (LTE)).

The environment management block 140 may be configured to operate a rule (policy) block 150, inference block 152, provisioning block 154, and analytics block 156. The rule block 150 may store a set of rules associated with a home environment. The rules may be designed to provide associations between detected variations in signal parameters provided by RFID tags located in the home environment and conditions associated with an area of the environment. For example, a rule may provide that a detection of signal variation from RFID tags that corresponds to an occlusion of more than a particular number of adjacent floor tiles having the RFID tags, for a time period above a threshold, may mean that a person may be lying on the floor of the area.

In another example, a rule may provide that a detection of signal variations from RFID tags that corresponds to increased wetness of the surface (floor) may mean that floor may be wet, or in some instances, depending on detected signal variation values, may be flooded. A rule may further provide an association between identified conditions and actions to be undertaken in response to the identified conditions. For example, a rule may provide that if a "standing water" condition is identified in a shower room, the water main may need to be shut off.

In another example, a rule may provide a combination of a detection of signal variation from RFID tags that correspond to, for example, occlusion, and detection of abnormal information provided by other sensors located in the home environment. For example, the heat sensors may provide information about an abnormal level of ambient temperature (or water temperature) in the house. The rule may state that, for example, there is standing water in the room, there is occlusion, and the water temperature is above a threshold, the condition may be identified that there is a person lying in the room in hot water.

The inference block 152 may store logic configured to make inferences based on a set of rules. For example, the inference block 152 may determine that the signal data is received from the RFID tags located in a bedroom, and select a subset of rules that may apply to the bedroom-related signal data. In some embodiments, the signal data from RFID tags may include flags that indicate conditions to be checked for a particular area, and the rules may be applied according to the flagged conditions. For example, for a bedroom, a condition such as a possible intrusion may need to be checked. This condition may be flagged accordingly in the signal data received from the bedroom-located RFID tags. Accordingly, the inference block 152 may select the rule that checks the intrusion condition when applied to signal data. For example, the inference block 152 may detect that the signal provided an RFID tag (e.g., RSSI) has exceeded (or is below) a threshold, which may correspond to the intrusion condition.

The provisioning block 154 may be configured to provision the RFID tags (and/or associated sensors) located in the home environment. More specifically, the provisioning block 154 may store, in each RFID tag, the following information: RFID tag identifier, a type of RFID tag (e.g., a location of the tag, be it shower, bedroom, laundry room or other area), and one or more flags that may identify conditions to be checked for the RFID tag location. Continuing with above example, the provisioning block 154 may store in a memory of an RFID tag located in the bedroom a flag to indicate that intrusion condition may need to be checked.

In another embodiment, the provisioning block 154 may store the above information in memory accessible by the environment management block 140 (e.g., memory 144). Accordingly, the environment management block 140 may retrieve stored information from memory 144, e.g., based on the RFID tag identifier provided in the signal received from this RFID tag. Thus, the conditions for the RFID tag location may be accessed on demand by the environment management block 140.

The analytics block 156 may comprise a context aware engine configured to recognize and record the conditions detected by the inference engine 152 as defined by the rule engine 150 and when abnormal conditions are detected, determine if an appropriate response may be actuated. For example, if a "standing water" condition is identified in the shower room, and no other conditions in the shower room (e.g., person lying on the floor of the shower room or person standing in the shower, and the water temperature is above a threshold), the analytics block may actuate a response to "shut off the water main" according to the rules provided by the rule block 150.

The analytics block 156 may further determine whether the content of the rule block 150 and/or inference block 152 may need to be corrected based on the recognition of sequence of events occurring in the home environment (or an area of the home environment) that may nullify the need for response actuation. In summary, the analytics block 156 may act as the cognitive, continuous learning state machine that may predict events and adjust the rules or modify the inferences according to the predictive analysis of events related to the home environment that has been observer over time.

For example, a "standing water" condition may be repeatedly detected in a shower room as occurring on the same day of the week approximately at the same time over a period of a few weeks. The analytics block 156 may be configured to infer that this condition may not need to be responded to (e.g., by calling 911 or turning off the water main), because the condition may have been caused by a regular cleaning session.

In summary, the environment management block 140, configured as described above, may identify one or more conditions of the area 110, based on the variations in the parameters and respective locations of the RFID tags 102, 104, 106 (and associated sensors) in the area 110. The environment management block 140 may select one or more actions, from a plurality of actions associated with the home environment, based at least in part on the identified conditions. The action list may be stored in the memory 144 and may be retrievable by the environment management block 140. The environment management block 140 may perform, or cause to be performed the selected actions in response to the identified conditions, in order to correct these conditions or mitigate the consequences of these conditions. Following the example above, if intrusion condition is determined, an action to take may be initiation of alert to the home owners and/or emergency services (e.g., 911). The environment management block 140 may provide such alert (or command to initiate an alert) via secure network 136 to an early warning server 160, which may provide a corresponding command via network 162 (e.g., Internet, intranet or other appropriate network) to a response actuation block 164, for command implementation (e.g., initiation of a phone call at 911).

Figure 5:
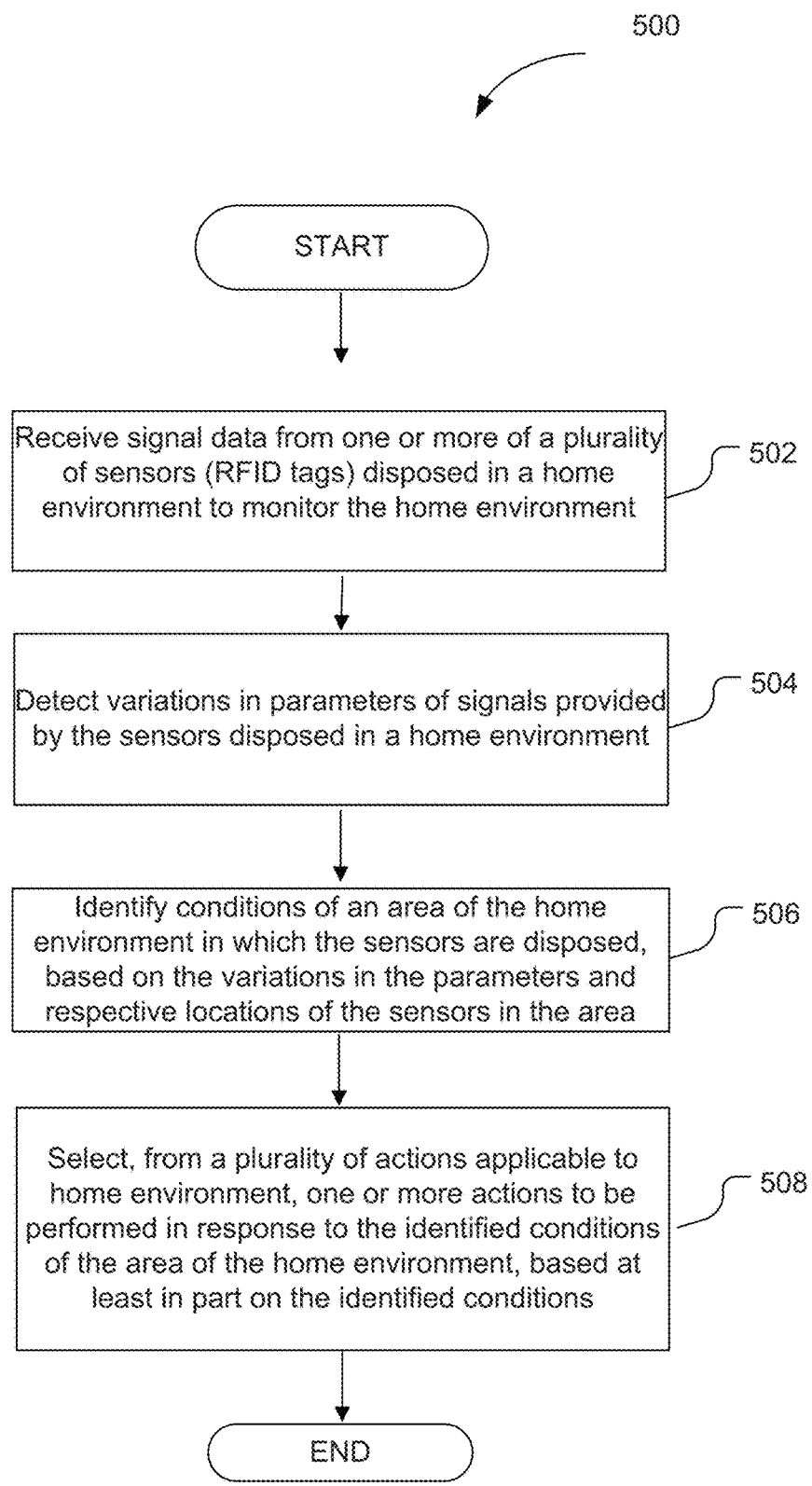
FIG. 5 is an example process flow/algorithmic structure diagram for managing home environment, in accordance with some embodiments.

FIG. 5 is an example process flow/algorithmic structure diagram for managing home environment, in accordance with some embodiments. The process 500 may comport with some of the system embodiments described in reference to FIGS. 1-4. For example, the process 500 may be performed by the environment management block 140 of FIG. 1 (i.e., process 500 also depicts embodiments of the algorithmic structure of environment management block 140). In alternate embodiments, the process 1000 may be practiced with more or fewer operations, or a different order of the operations.

The process 500 may begin at block 502 and include receiving signal data from one or more of a plurality of RFID tags (and/or associated sensors) disposed in a home environment to monitor the home environment.

At block 504, the process 500 may include detecting variations in parameters of signals provided by the RFID tags disposed in the home environment. As discussed above, variations may include reductions of RSSI values in the signals provided by RFID tags, e.g., below a particular threshold.

At block 506, the process 500 may include identifying conditions of an area of the home environment in which the one or more RFID tags are disposed, based at least in part on the variations in the one or more parameters and respective locations of the one or more RFID tags in the area of the home environment. The identified conditions may indicate abnormalities occurring in the area of the home environment.

At block 508, the process 500 may include selecting from a plurality of actions applicable to the home environment, one or more actions to be performed in response to the identified conditions of the area of the home environment, based at least in part on the identified conditions. The actions may be implemented in response to the identified conditions, in order to correct or mitigate the abnormalities in the area, indicated by the conditions.

Various details of the example process 500 will be described in reference to FIGS. 6-10.

Figure 6:
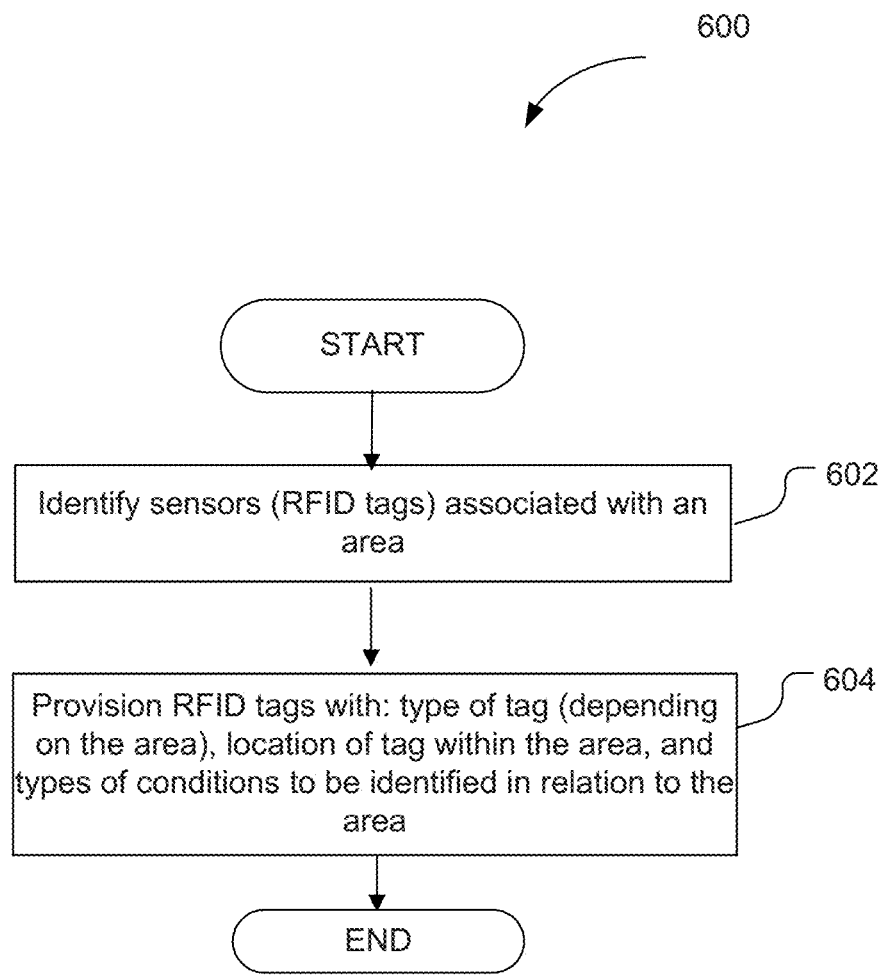
FIG. 6 is an example process flow/algorithmic structure diagram for provisioning RFID tags for a home environment, in accordance with some embodiments.

FIG. 6 is an example process flow/algorithmic structure diagram for provisioning RFID tags for a home environment, in accordance with some embodiments. The process 600 may be performed by the environment management block 140 (e.g., provisioning block 154) of FIG. 1 (i.e., process 600 also depicts an embodiment of aspects of the algorithmic logic of the provisioning block 154).

The process 600 may begin at block 602 and include identifying RFID tags located in the home environment. More specifically, the environment management block 140 may identify the RFID tags located in different areas of home environment.

At block 604, the process 600 may include provisioning the RFID with area-specific information. More specifically, the RFID tags may be caused to store, for each RFID tag, an RFID tag identifier, information related to an area in which the RFID tag is located (e.g., a shower, bedroom, laundry room, hallway, or other area), relative location of the RFID tag in the area (e.g. 2D or 3D coordinates), and the flags that may identify conditions to be checked for the area in which the RFID tag is located. In operation, the RFID tags, provisioned as described, may provide this information to the RFID reader 130, to be analyzed by the environment management block 140, as described in reference to FIG. 5.

As discussed above, in alternative embodiments, provisioning may include storing information regarding tag location and condition flag in memory accessible by the environment management block 140 (e.g., memory 144). Accordingly, the environment management block 140 may be able to retrieve stored information from memory 144 based on, for example, RFID tag identifier provided by the RFID tag.

Figure 7:
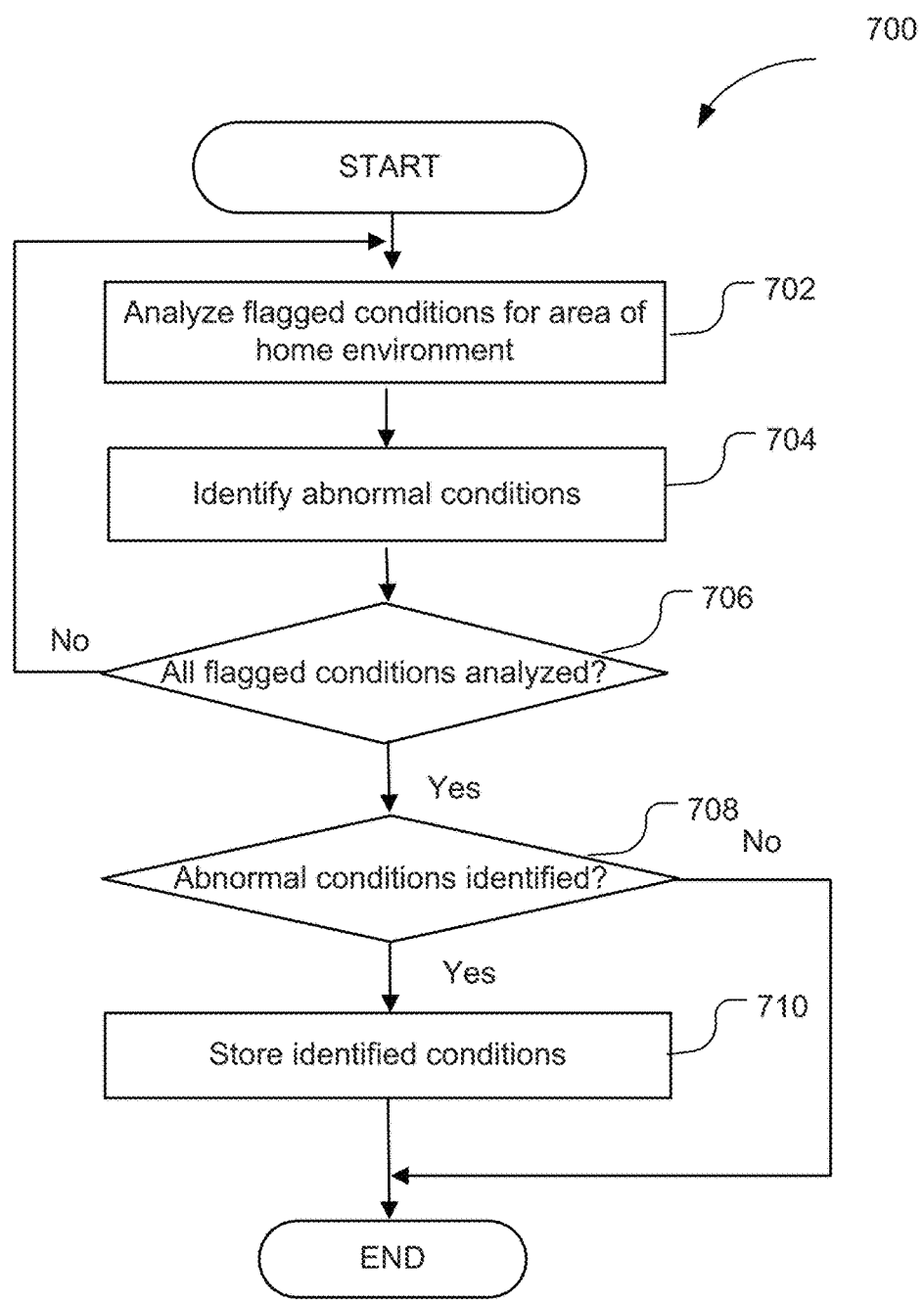
FIG. 7 is an example process flow/algorithmic structure diagram for identifying abnormal conditions of an area of a home environment, in accordance with some embodiments.

FIG. 7 is an example process flow/algorithmic structure diagram for identifying abnormal conditions of an area of a home environment, in accordance with some embodiments. The process 700 may be performed by the environment management block 140 (e.g., rule block 150 and inference block 152) of FIG. 1 (i.e., process 700 also depicts an embodiment of aspects of the algorithmic logic of the rule block 150 and inference block 152). The process 700 may comport with actions described in reference to block 506 of FIG. 5.

The process 700 may begin at block 702 and include analyzing conditions for an area of a home environment that may have been flagged for the area. The conditions to analyze may include those conditions that may have been flagged in the signal data provided by the RFID tags provisioned as described in reference to FIG. 6.

In some embodiments, the condition flags pertaining to an area of the home environment may be pre-stored (e.g., in the memory 144 of the environment management block 140). The flags may be stored, for example, in association with location of RFID tags disposed in the area. In another example, the flags may be stored in association with an area identifier. The flags may be retrievable based on their associations with an area identifier or RFID tag identifier.

For example, if the area of the home environment is a shower room, the conditions to be analyzed (and accordingly flagged) may include "standing water," "wet floor," "hot temperature (above a threshold)," "person standing on the floor in the shower room," "person lying on the floor for a time period above (below) a threshold," and so on.

At block 704, the process 700 may include identifying abnormal conditions (if any), among those analyzed. More specifically the signal variations (e.g., RSSI values) may be analyzed in accordance to embodiments described in reference to FIGS. 2 and 3.

At decision block 706, it may be determined whether all flagged conditions have been analyzed. If not all flagged conditions have been analyzed, the process 700 may return to block 702. If all flagged conditions have been analyzed, the process 700 may move to decision block 708.

At decision block 708, it may be determined whether conditions that may be considered abnormal for the area of the home environment have been identified at block 704. If such conditions have been identified, the abnormal conditions may be stored at block 710 for further processing.

Figure 8:
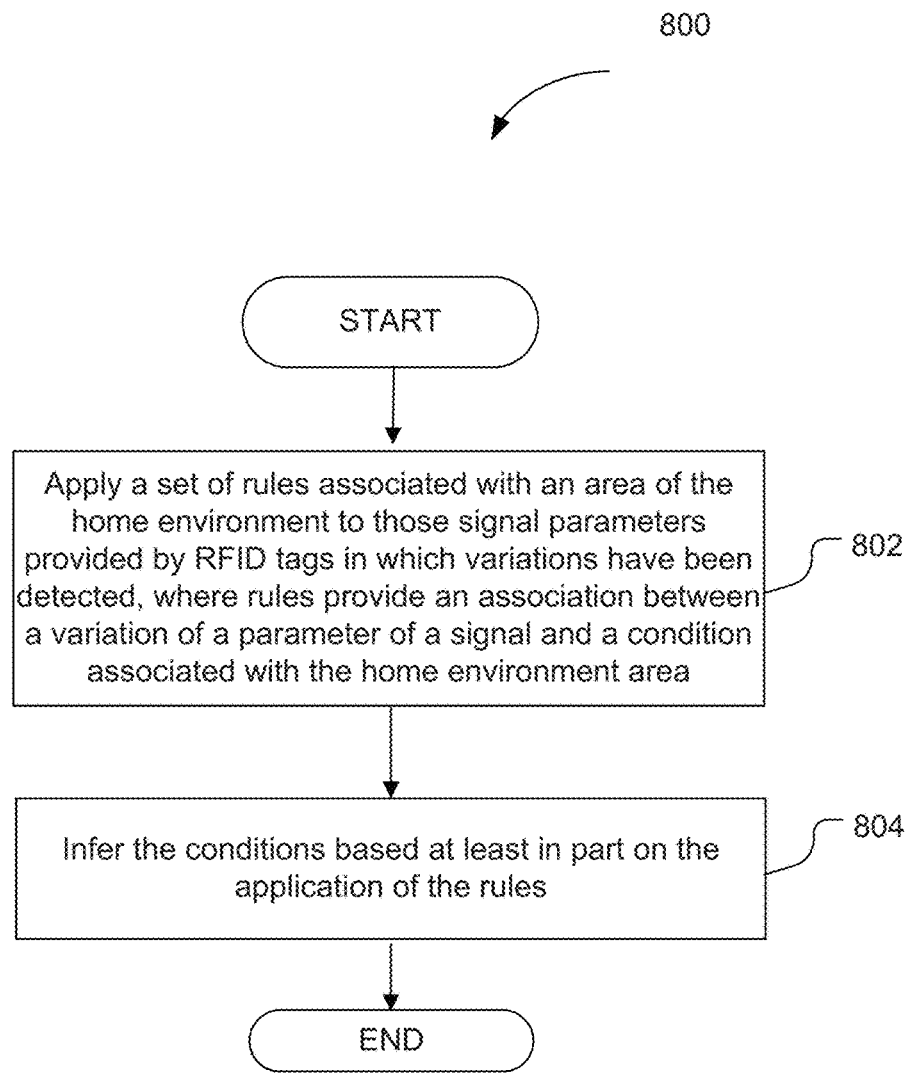
FIG. 8 is an example process flow/algorithmic structure diagram for some aspects of identifying abnormal conditions of an area of a home environment, in accordance with some embodiments.

FIG. 8 is an example process flow/algorithmic structure diagram for some aspects of identifying abnormal conditions of an area of a home environment, in accordance with some embodiments. The process 800 may be performed by the environment management block 140 of FIG. 1. The process 800 may comport with actions described in reference to blocks 702-704 of FIG. 7.

The process 800 may begin at block 802 and include applying a set of rules associated with an area of the home environment to those parameters of signals provided by RFID tags disposed in the home environment in which variations have been detected (e.g., at block 502 of FIG. 5), in accordance with the flagged conditions for the area, as described in reference to FIG. 7. As described above, the rules may provide an association between variations of signal parameters and a condition associated with the home environment area. For example, if variations in signal parameters have been detected in signals provided by RFID tags of a particular area (e.g., shower room), the rules associated with identifier of this area may be applied to these parameters.

At block 804, the process 800 may include inferring the conditions (e.g., indicating abnormalities in the area of the home environment) based at least in part on the application of the rules.

Figure 9:
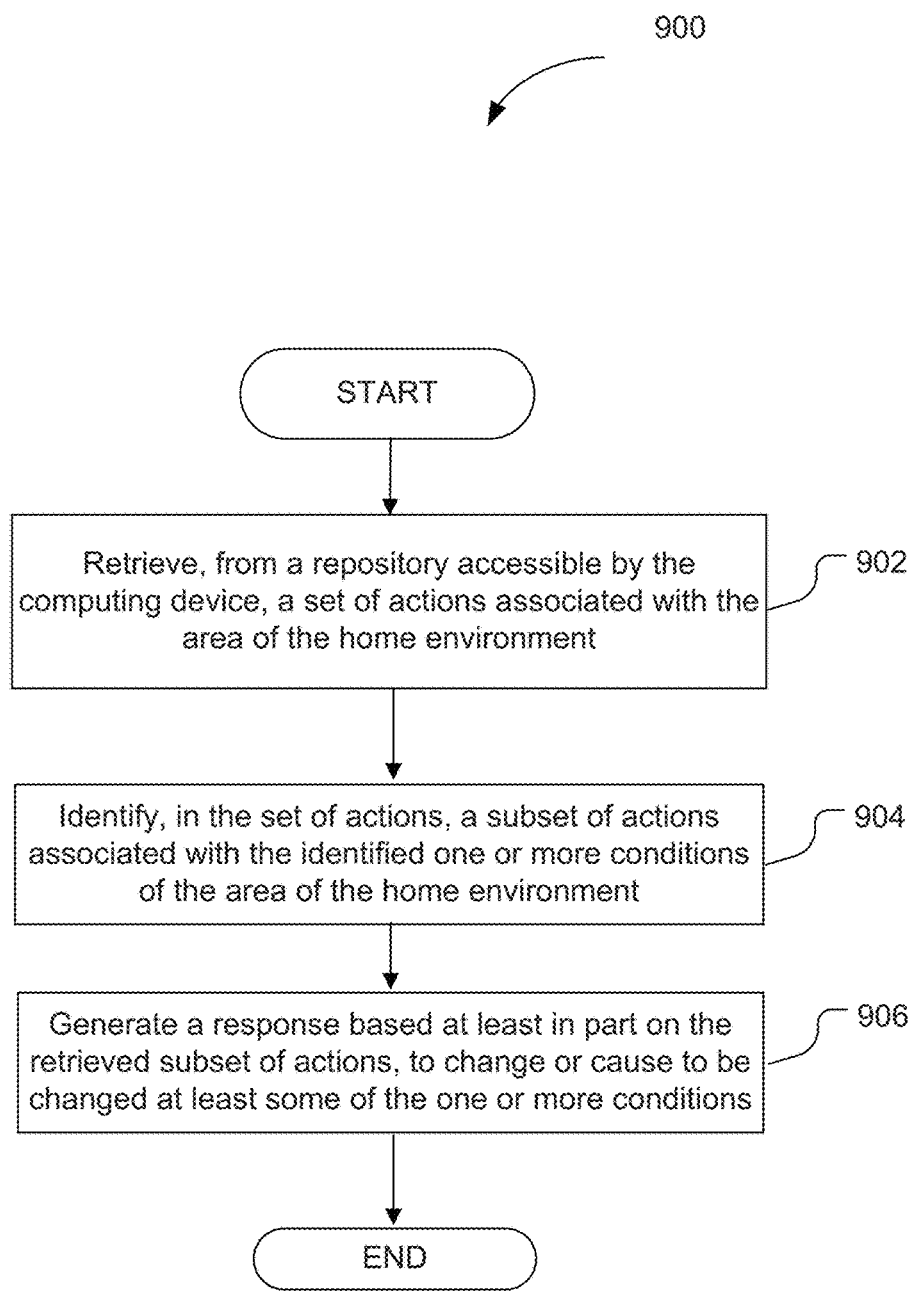
FIG. 9 is an example process flow/algorithmic structure diagram for selecting actions to response to identified abnormal conditions of an area of a home environment, in accordance with some embodiments.

FIG. 9 is an example process flow/algorithmic structure diagram for selecting actions to response to identified abnormal conditions of an area of a home environment, in accordance with some embodiments. The process 900 may be performed by the environment management block 140 (e.g., rule block 150, inference block 152, and analytics block 156) of FIG. 1, (i.e., process 900 also depicts an embodiment of aspects of the algorithmic logic of the rule block 150 inference block 152, and analytics block 156). The process 900 may comport with actions described in reference to block 508 of FIG. 5.

The process 900 may begin at block 902 and include retrieving, from a repository accessible by the computing device, a set of actions associated with the area of the home environment.

At block 904, the process 900 may include identifying, in the set of actions, a subset of actions associated with the identified one or more conditions of the area of the home environment.

At block 906, the process 900 may include generating a response based at least in part on the retrieved subset of actions, to change or cause to be changed at least some of the one or more conditions FIG. 10 provides an example list of areas of a home environment, associated conditions to be analyzed, and actions to be taken in response to identified conditions, in accordance with some embodiments.

In the column 1002, different areas of a home environment are listed, such as shower room, laundry room, bathroom, bedroom, and the like. For example, the RFID tags disposed in the home environment may be classified and identified according to their type, e.g., their location in the home environment. The RFID tags may be disposed in the surface (flooring) of the listed areas of the home environment, and may be associated (e.g., via their identifier) with the area in which they are disposed.

Columns 1004 indicate different conditions to be analyzed in relation to a particular area. As discussed the RFID tags may be provisioned with such information. For example, certain flags (bits) of the RFID tag memory may be set to a particular value (e.g., "1") to indicate the conditions to be analyzed. These flags are indicated in the table by symbols "X" placed in respective parts of the table.

For a shower room, these conditions may include "standing water" (RSSI and/or read rate reductions below a respective first threshold as described in reference to FIG. 3) "wet floor" (RSSI and/or read rate reductions below a respective second threshold, which is lower than the respective first threshold, as described in reference to FIG. 4), "high temperature" (e.g., above a threshold of 110 F), "person standing on the floor in the shower room" (fewer than six tiles are occluded as indicated by respective RSSI and described in reference to FIG. 3), "person lying on the floor for a time period above (below) a threshold of 2 minutes" (more than seven tiles are occluded as indicated by respective RSSI and described in reference to FIG. 3), "traffic detection" (changing signal patterns showing occlusion of tiles in a step pattern for time periods less than a threshold, e.g., few seconds as indicated by respective RSSI and described in reference to FIG. 3), and "lockup" (check whether the security system of the house is armed). All flagged conditions may be analyzed in relation to a particular area (e.g., shower room) and some of them may be identified as abnormal. For example, it may be established that the ambient temperature in the shower room is above a threshold and there is a person lying on the floor of the shower room.

Column 1006 includes descriptions of actions that may be undertaken in response to conditions that may have been identified as abnormal in relation to a particular area of the home environment. Following with the shower room example, if, for example, the following conditions were identified as abnormal: a person is lying on the floor for over two minutes, and the ambient (or water) temperature is above 110 F, the owners may be notified (e.g., texted) and emergency services (911) may be called. In another example, if standing water is identified in a shower room, the water temperature is determined to be above a threshold, and the person is lying on the floor, the water main may be shut down so the person does not get burned.

In still another example, if an abnormal condition (e.g., "standing water") is identified in a laundry room, the actions to be taken may include notifying the owners and emergency services, and attempting to shut down the water main.

In yet another example, if the house security/alarm system is set, which indicates that nobody should be home at the time, and traffic is detected in an area (e.g., signal change caused by the intruder's occlusion for tiles and associated RFID tags of the area, a family member may be notified and consequently (e.g., if a situation is not defused over a time period) a 911 call may be initiated.

In still another example, a person may be detected to be standing in the shower room, the water (shower) temperature may be identified to be above a threshold, and the floor of the shower room may be determined to be wet. To determine a temperature, some RFID tags in the shower room may include a heat sensor for tiles in the bathroom and may be configured to emit voltage corresponding to a temperature value above a threshold (e.g., above 110 F) via the RF link. The actions to take may include early warning to the owner about possible skin burns especially if a time period has elapsed, and shut down or cool off the water to acceptable level.

The following paragraphs describe examples of various embodiments.

Example 1 may be an apparatus for managing home environment, comprising: a processor and an environment management block to be operated by the processor to manage a home environment, wherein the environment management block is to: detect variations in one or more parameters of signals provided by one or more of a plurality of radio-frequency identification (RFID) tags disposed in the home environment to monitor the home environment; identify one or more conditions of an area of the home environment in which the one or more RFID tags are disposed, based at least in part on the variations in the one or more parameters and respective locations of the one or more RFID tags in the area of the home environment; and select one or more actions, from a plurality of actions associated with the home environment, based at least in part on the identified conditions, wherein the one or more actions are to be performed to manage the home environment.

Example 2 may include the subject matter of Example 1, wherein the RFID tags are disposed around the home environment area in a pattern, wherein at least some of the RFID tags are disposed in respective tiles that comprise portions of a surface of the home environment area.

Example 3 may include the subject matter of Example 1, wherein the parameters of the signal include: a received signal strength indicator (RSSI), wherein a first variation of the parameters includes a reduction of the RSSI below an RSSI threshold; and a duration of a signal associated with the RSSI, wherein a second variation of the parameters includes a duration of the signal change that corresponds to the RSSI above the RSSI threshold, wherein the duration of the signal change is above a first duration threshold or below a second duration threshold.

Example 4 may include the subject matter of Example 1, wherein the home environment comprises a building, wherein the area of the home environment comprises a part of the building, wherein the area is selected from one of: a bathroom, a bedroom, a hallway, a pantry, a laundry room, a living room, or a kitchen.

Example 5 may include the subject matter of Example 4, wherein the RFID tags are disposed in a surface of the area of the home environment, wherein the surface includes one or more of: a floor, a wall, or a ceiling.

Example 6 may include the subject matter of Example 1, wherein the home environment management block is to be operated by the processor to continuously or periodically receive the signals from the plurality of RFID tags.

Example 7 may include the subject matter of Example 1, wherein the environment management block is to be operated by the processor to generate a response based at least in part on the one or more actions, to change or cause to be changed at least some of the one or more conditions.

Example 8 may include the subject matter of Example 7, wherein the plurality of actions applicable to the home environment includes a set of actions associated with the area of the home environment, wherein the set of actions includes one or more subsets of actions, wherein each subset is associated with at least one condition of the home environment area.

Example 9 may include the subject matter of Example 8, wherein to select the one or more actions, and generate a response based at least in part on the one or more actions, wherein the environment management block is to: retrieve, from a repository accessible by the apparatus, the set of actions associated with the area of the home environment; identify, in the set of actions, a subset of actions associated with the identified one or more conditions of the area of the home environment; and generate the response based at least in part on the retrieved subset of actions.

Example 10 may include the subject matter of Example 1, wherein the actions include one or more of: issuance of an alert to indicate the conditions of the area of the home environment, or provision of a command to a device associated with the home environment to correct at least one of the one or more conditions of the area of the home environment, wherein the response includes one or more of: initiation of the issuance of the alert, or initiation of the provision of the command to the device associated with the home environment.

Example 11 may include the subject matter of Example 1, wherein a signal provided by an RFID tag of the one or more of the plurality of RFID tags includes data that indicates at least one or more of: an identifier of the RFID tag, wherein the identifier indicates an association of the RFID tag with the area of the home environment; and a location of the RFID tag in the area of the home environment.

Example 12 may include the subject matter of Example 11, wherein the data further includes indicators of conditions that correspond to the area of the home environment.

Example 13 may include the subject matter of Example 1, wherein to identify one or more conditions of an area of the home environment, the environment management block is to: apply a set of rules associated with the area of the home environment to those parameters in which variations have been detected; and infer the one or more conditions based at least in part on the application of the set of rules, wherein a rule of the set of rules provides an association between a variation of at least one parameter of a signal and at least one condition associated with the home environment area.

Example 14 may include the subject matter of any Examples 1 to 13, wherein the conditions include one or more of: a rise of ambient temperature above a threshold, water covering a surface of the area above a threshold, movement in the area, or a person standing in the area or lying on the surface of the area for a duration above a threshold.

Example 15, may be a method for managing home environment, comprising: detecting, by a computing device, variations in one or more parameters of signals provided to the computing device by one or more of a plurality of radio-frequency identification (RFID) tags disposed in a home environment to monitor the home environment; identifying, by the computing device, one or more conditions of an area of the home environment in which the one or more RFID tags are disposed, based at least in part on the variations in the one or more parameters and respective locations of the one or more RFID tags in the area of the home environment; and selecting, by the computing device, from a plurality of actions applicable to the home environment, one or more actions to be performed in response to the identified conditions of the area of the home environment, based at least in part on the identified conditions.

Example 16 may include the subject matter of Example 15, further comprising: generating, by the computing device, a response based at least in part on the one or more actions, to change or cause to be changed at least some of the one or more conditions.

Example 17 may include the subject matter of Example 15, wherein identifying one or more conditions of an area of the home environment in which the one or more RFID tags are disposed includes: applying, by the computing device, a set of rules associated with the area of the home environment to those parameters in which variations have been detected; and inferring, by the computing device, the one or more conditions based at least in part on the application of the set of rules, wherein a rule of the set of rules provides an association between a variation of at least one parameter of a signal and at least one condition associated with the home environment area.

Example 18 may include the subject matter of Example 16, wherein selecting one or more actions to be performed in response to the identified conditions includes: retrieving, by the computing device, from a repository accessible by the computing device, a set of actions associated with the area of the home environment; identifying, by the computing device, in the set of actions, a subset of actions associated with the identified one or more conditions of the area of the home environment; wherein generating a response includes providing, by the computing device, a response based at least in part on the retrieved subset of actions, wherein the response includes one or more of: issuance of an alert to indicate the conditions of the area of the home environment, or initiation of a command to a device associated with the home environment to correct at least one of the one or more conditions of the area of the home environment.

Example 19 may include the subject matter of any Examples 15 to 18, further comprising: receiving, by the computing device, continuously or periodically, the signals from the plurality of RFID tags, wherein RFID tags are disposed around a surface of the home environment area in a pattern, wherein each RFID tag is disposed in a tile that comprises a portion of the surface of the home environment area.

Example 20 may be one or more non-transitory computing device-readable storage media having instructions for managing home environment stored thereon that, in response to execution by a computing device, cause the computing device to: detect variations in one or more parameters of signals provided by one or more of a plurality of radio-frequency identification (RFID) tags disposed in a home environment to monitor the home environment; identify one or more conditions of an area of the home environment in which the one or more RFID tags are disposed, based at least in part on the variations in the one or more parameters and respective locations of the one or more RFID tags in the area of the home environment; and select, from a plurality of actions applicable to the home environment, one or more actions to be performed in response to the identified conditions of the area of the home environment, based at least in part on the identified conditions.

Example 21 may include the subject matter of Example 20, wherein the instructions to identify one or more conditions of an area of the home environment cause the computing device to: apply a set of rules associated with the area of the home environment to those parameters in which variations have been detected; and infer the one or more conditions based at least in part on the application of the set of rules, wherein a rule of the set of rules provides an association between a variation of at least one parameter of a signal and at least one condition associated with the home environment area.

Example 22 may include the subject matter of Example 20, wherein the instructions to select one or more actions to be performed in response to the identified conditions of the area of the home environment cause the computing device to: retrieve, from a repository accessible by the computing device, a set of actions associated with the area of the home environment; and identify, in the set of actions, a subset of actions associated with the identified one or more conditions of the area of the home environment.

Example 23 may include the subject matter of any Examples 20 to 22, wherein the instructions further cause the computing device to receive, continuously or periodically, the signals from the plurality of RFID tags, wherein RFID tags are disposed around a surface of the home environment area in a pattern, wherein each RFID tag is disposed in a tile that comprises a portion of the surface of the home environment area.

Example 24 may include the subject matter of Example 22, wherein the instructions further cause the computing device to: generate a response based at least in part on the retrieved subset of actions, to change or cause to be changed at least some of the one or more conditions, wherein the response includes one or more of: issuance of an alert to indicate the conditions of the area of the home environment, or initiation of a command to a device associated with the home environment to correct at least one of the one or more conditions of the area of the home environment.

Example 25 may be an apparatus for managing home environment, comprising: means for detecting variations in one or more parameters of signals provided to the computing device by one or more of a plurality of radio-frequency identification (RFID) tags disposed in a home environment to monitor the home environment; means for identifying one or more conditions of an area of the home environment in which the one or more RFID tags are disposed, based at least in part on the variations in the one or more parameters and respective locations of the one or more RFID tags in the area of the home environment; and means for selecting from a plurality of actions applicable to the home environment, one or more actions to be performed in response to the identified conditions of the area of the home environment, based at least in part on the identified conditions.

Example 26 may include the subject matter of Example 25, further comprising: means for generating a response based at least in part on the one or more actions, to change or cause to be changed at least some of the one or more conditions.

Example 27 may include the subject matter of Example 25, wherein means for identifying one or more conditions of an area of the home environment in which the one or more RFID tags are disposed includes: means for applying a set of rules associated with the area of the home environment to those parameters in which variations have been detected; and means for inferring the one or more conditions based at least in part on the application of the set of rules, wherein a rule of the set of rules provides an association between a variation of at least one parameter of a signal and at least one condition associated with the home environment area.

Example 28 may include the subject matter of Example 26, wherein means for selecting one or more actions to be performed in response to the identified conditions includes: means for retrieving from a repository accessible by the computing device, a set of actions associated with the area of the home environment; means for identifying in the set of actions, a subset of actions associated with the identified one or more conditions of the area of the home environment; wherein means for generating a response includes means for providing a response based at least in part on the retrieved subset of actions, wherein the response includes one or more of: issuance of an alert to indicate the conditions of the area of the home environment, or initiation of a command to a device associated with the home environment to correct at least one of the one or more conditions of the area of the home environment.

Example 29 may include the subject matter of any Examples 25 to 28, further comprising: means for receiving continuously or periodically, the signals from the plurality of RFID tags, wherein RFID tags are disposed around a surface of the home environment area in a pattern, wherein each RFID tag is disposed in a tile that comprises a portion of the surface of the home environment area.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A system, comprising:
a processor;
a sensor hub having a reader to read a plurality of radio-frequency identification (RFID) tags disposed in a surface of an area of a home environment;
an environment management block communicatively coupled with the sensor hub and operated by the processor to:
detect variations in one or more parameters of signals provided by one or more of the plurality of RFID tags via the sensor hub;
apply a set of rules associated with the area of the home environment to those parameters in which variations have been detected, to identify one or more conditions of the area, wherein the rules include: a number of tiles of the area surface, in which the one or more RFID tags are installed and provide the signals with parameter variations, is above a number threshold; and duration of the provision of signal variations is above a duration threshold; wherein the one or more conditions to be identified include a standing water in the area; and
select one or more actions, from a plurality of actions associated with the home environment, based at least in part on the identified one or more conditions, wherein the one or more actions include an alert indicating the standing water condition, or a command to shut off one or more water valves associated with the home environment; and
a response actuation block communicatively coupled with the environment management block, to implement the command to shut off the water main.

2. The system of claim 1, wherein the RFID tags are disposed around the home environment area in a pattern.

3. The system of claim 1, wherein the parameters of the signal include:
a received signal strength indicator (RSSI), wherein a variation of the one or more parameters includes the RSSI below an RSSI threshold.

4. The system of claim 1, wherein the home environment comprises a building, wherein the area of the home environment comprises a part of the building, wherein the area is selected from one of: a bathroom, a bedroom, a hallway, a pantry, a laundry room, a living room, or a kitchen.

5. The system of claim 4, wherein the surface includes one or more of: a floor, a wall, or a ceiling.

6. The system of claim 1, wherein the environment management block is operated by the processor to continuously or periodically receive the signals from the plurality of RFID tags.

7. The system of claim 1, wherein the environment management block is operated by the processor to generate a response based at least in part on the one or more actions, to change or cause to be changed at least some of the one or more conditions.

8. The system of claim 7, wherein the plurality of actions applicable to the home environment includes a set of actions associated with the area of the home environment, wherein the set of actions includes one or more subsets of actions, wherein each subset is associated with at least one condition of the home environment area.

9. The system of claim 8, wherein to select the one or more actions, includes to generate a response based at least in part on the one or more actions, wherein the environment management block is to:
retrieve, from a repository accessible by the system, the set of actions associated with the area of the home environment;
identify, in the set of actions, a subset of actions associated with the identified one or more conditions of the area of the home environment; and
generate the response based at least in part on the retrieved subset of actions.

10. The system of claim 9, wherein the subset of actions includes one or more of: issuance of an alert to indicate the conditions of the area of the home environment, or provision of a command to a device associated with the home environment to correct at least one of the one or more conditions of the area of the home environment, wherein the response includes one or more of: initiation of the issuance of the alert, and initiation of the provision of the command to the device associated with the home environment.

11. The system of claim 1, wherein a signal provided by an RFID tag of the one or more of the plurality of RFID tags includes data that indicates at least one or more of:
an identifier of the RFID tag, wherein the identifier indicates an association of the RFID tag with the area of the home environment; and
a location of the RFID tag in the area of the home environment.

12. The system of claim 11, wherein the data further includes indicators of conditions that correspond to the area of the home environment.

13. The system of claim 1, wherein to identify one or more conditions of an area of the home environment, the environment management block is to:
infer the one or more conditions based at least in part on the application of the set of rules, wherein a rule of the set of rules provides an association between a variation of at least one parameter of a signal and at least one condition associated with the home environment area.

14. The system of claim 1, wherein the conditions include one or more of: a rise of ambient temperature above a threshold, movement in the area, or a person standing in the area or lying on the surface of the area for a duration above a threshold.

15. A method, comprising:
detecting, by a computing device, variations in one or more parameters of signals provided to the computing device by one or more of a plurality of radio-frequency identification (RFID) tags disposed in a surface or an area of a home environment to monitor the home environment;
applying, by the computing device, a set of rules associated with the area of the home environment to those parameters in which variations have been detected, to identify one or more conditions of the area, wherein the rules include: a number of tiles of the area surface, in which the one or more RFID tags are installed and provide the signals with parameter variations, is above a number threshold; and duration of the provision of signal variations is above a duration threshold; wherein the one or more conditions to be identified include a standing water in the area;
identifying, by the computing device, at least one of the one or more conditions of the area of the home environment, wherein the at least one condition includes a standing water in the area; and
selecting, by the computing device, from a plurality of actions applicable to the home environment, one or more actions to be performed in response to the identified conditions of the area of the home environment, based at least in part on the identified conditions, wherein the one or more actions include an alert indicating the standing water condition, or a command to shut off one or more water valves associated with the home environment.

16. The method of claim 15, further comprising: generating, by the computing device, a response based at least in part on the one or more actions, to change or cause to be changed at least some of the one or more conditions.

17. The method of claim 15, wherein the identifying one or more conditions of an area of the home environment in which the one or more RFID tags are disposed includes:
inferring, by the computing device, the one or more conditions based at least in part on the application of the set of rules,
wherein a rule of the set of rules provides an association between a variation of at least one parameter of a signal and at least one condition associated with the home environment area.

18. The method of claim 16, wherein the selecting one or more actions to be performed in response to the identified conditions includes:
retrieving, by the computing device, from a repository accessible by the computing device, a set of actions associated with the area of the home environment; and
identifying, by the computing device, in the set of actions, a subset of actions associated with the identified one or more conditions of the area of the home environment;
wherein generating a response includes providing, by the computing device, a response based at least in part on the retrieved subset of actions, wherein the response includes one or more of: issuance of an alert to indicate the conditions of the area of the home environment, or initiation of a command to a device associated with the home environment to correct at least one of the one or more conditions of the area of the home environment.

19. The method of claim 15, further comprising:
receiving, by the computing device, continuously or periodically, the signals from the plurality of RFID tags, wherein the RFID tags are disposed around the surface of the home environment area in a pattern, wherein each RFID tag is disposed in a tile that comprises a portion of the surface of the home environment area.

20. One or more non-transitory computing device-readable storage media having instructions for determination of conditions of an home environment stored thereon that, in response to execution by a computing device, cause the computing device to:
detect variations in one or more parameters of signals provided by one or more of a plurality of radio-frequency identification (RFID) tags disposed in a surface of the area of an home environment to monitor the home environment;
apply a set of rules associated with the area of the home environment to those parameters in which variations have been detected, to identify one or more conditions of the area, wherein the rules include: a number of tiles of the area surface, in which the one or more RFID tags are installed and provide the signals with parameter variations, is above a number threshold; and duration of the provision of signal variations is above a duration threshold; wherein the one or more conditions to be identified include a standing water in the area;
identify at least one of the one or more conditions of the area of the home environment, wherein the at least one condition includes a standing water in the area; and
select, from a plurality of actions applicable to the home environment, one or more actions to be performed in response to the identified conditions of the area of the home environment, based at least in part on the identified conditions, wherein the one or more actions include an alert indicating the standing water condition, or a command to shut off one or more water valves associated with the home environment.

21. The computing device-readable storage media of claim 20, wherein the instructions to identify one or more conditions of an area of the home environment cause the computing device to:
infer the one or more conditions based at least in part on the application of the set of rules,
wherein a rule of the set of rules provides an association between a variation of at least one parameter of the one or more parameters of signals and at least one condition of the one or more conditions associated with the home environment area.

22. The computing device-readable storage media of claim 20, wherein the instructions to select one or more actions to be performed in response to the identified conditions of the area of the home environment cause the computing device to:
retrieve, from a repository accessible by the computing device, a set of actions associated with the area of the home environment; and
identify, in the set of actions, a subset of actions associated with the identified one or more conditions of the area of the home environment.

23. The computing device-readable storage media of claim 20, wherein the instructions further cause the computing device to receive, continuously or periodically, the signals from the plurality of RFID tags, wherein the RFID tags are disposed around the surface of the home environment area in a pattern, wherein each RFID tag is disposed in a tile that comprises a portion of the surface of the home environment area.

24. The computing device-readable storage media of claim 22, wherein the instructions further cause the computing device to:
generate a response based at least in part on the retrieved subset of actions, to change or cause to be changed at least some of the one or more conditions, wherein the response includes one or more of: issuance of an alert to indicate the conditions of the area of the home environment, or initiation of a command to a device associated with the home environment to correct at least one of the one or more conditions of the area of the home environment.

* * * * *